United States Patent [19]

Call, Sr.

[11] 4,396,173
[45] Aug. 2, 1983

[54] MEANS FOR SECURING A FURNITURE JOINT

[76] Inventor: Gerald A. Call, Sr., Rte. 2, Box 330, Monroe, N.C. 28110

[21] Appl. No.: 170,605

[22] Filed: Jul. 21, 1980

[51] Int. Cl.³ .............................................. F16M 11/16
[52] U.S. Cl. .................................... 248/188; 403/217; 403/231
[58] Field of Search ......................... 248/188; 108/156; 403/231, 403, 169, 219, 217, 382, 205, 176; 411/120, 121, 119

[56] References Cited

U.S. PATENT DOCUMENTS

| | | | |
|---|---|---|---|
| 1,721,743 | 7/1929 | Nuberg | 403/403 X |
| 1,778,135 | 10/1930 | Williams | 248/188 |
| 2,485,784 | 10/1949 | Shoenberg | 248/188 |
| 4,124,186 | 11/1978 | Call | 403/231 X |

FOREIGN PATENT DOCUMENTS 896765  3/1945  France ................... 403/217

Primary Examiner—J. Franklin Foss
Attorney, Agent, or Firm—Richards, Shefte & Pinckney

[57] ABSTRACT

A furniture joint attachment bracket for applying securing force to a furniture leg and two side members connected by a furniture angle brace, the attachment bracket including a portion for engagement by the underside of the head and the square neck of a stove bolt for application of securing force to the joint while preventing turning of the bolt relative to the bracket. The head engaging portion of the bracket projects from laterally extending flanges thereof which fit against the leg to absorb the securing force thereon, and the bolt is extended through the leg and through the angle brace to receive a nut on the extending threaded end thereof for tightening thereon to pull the angle brace and the attachment bracket together thereby tightening and securing the leg between the side members of the joint.

1 Claim, 6 Drawing Figures

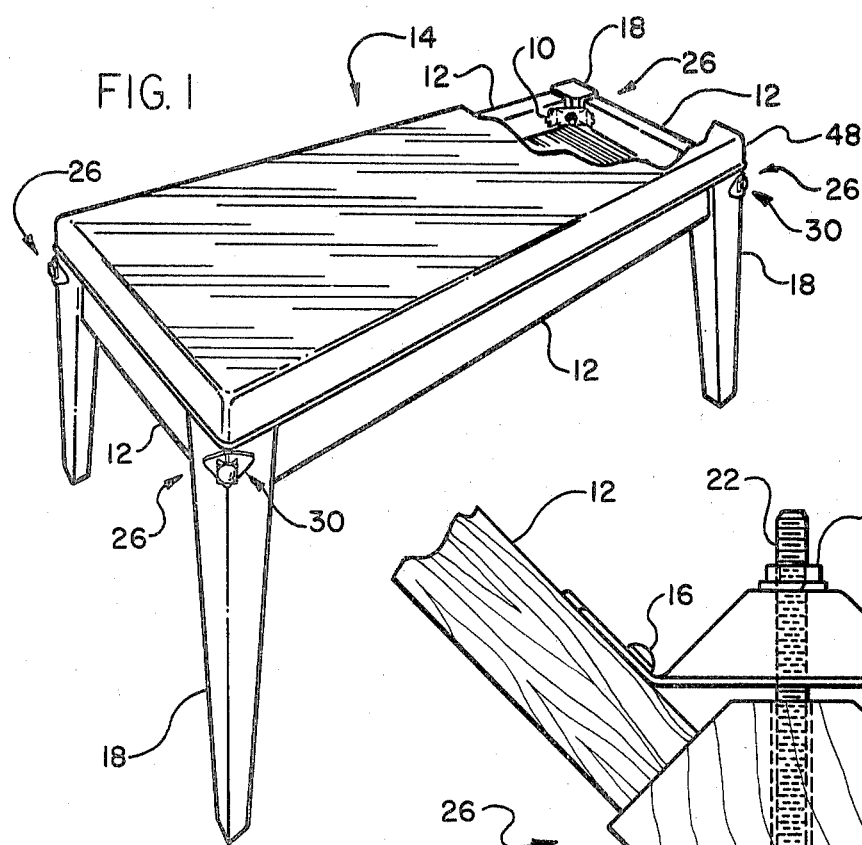
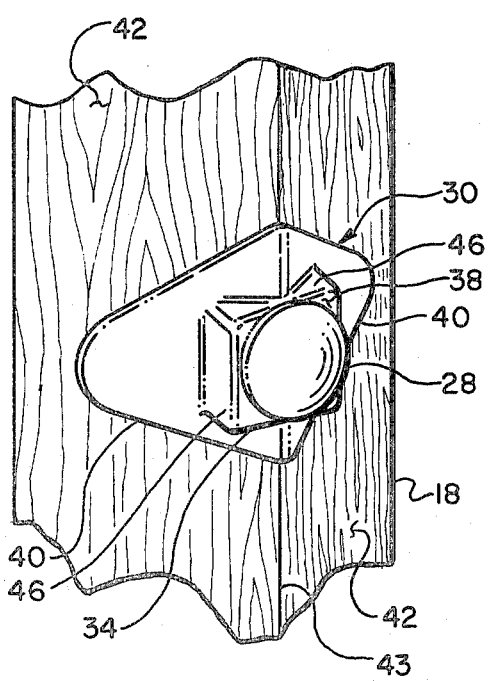
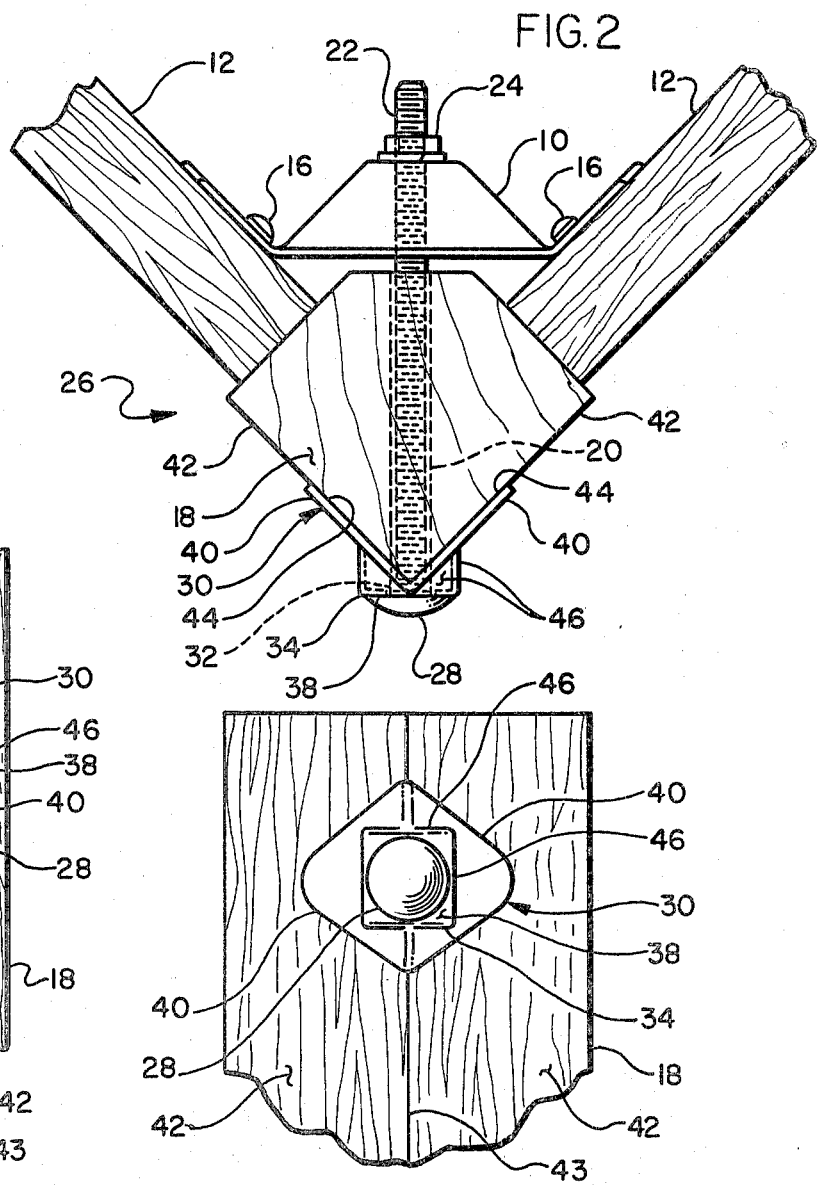
FIG. 1
FIG. 2
FIG. 3
FIG. 4

MEANS FOR SECURING A FURNITURE JOINT

BACKGROUND OF THE INVENTION

The present invention is directed to a furniture joint attachment bracket and more particularly to a bracket used with a furniture angle brace to secure two side apron members and a leg of furniture together in assembled relation.

Furniture angle braces are commonly used to secure side apron rails and legs together in the manufacture of piano benches, tables and other articles of furniture. My U.S. Pat. No. 4,124,186 presents the best known example of such a brace and provides and assures proper angular and planar self-alignment of the parts of the joint in which it is used, permits preassembly of side members and brace before introduction of the leg and its screw into the assembly for the inherent advantages thereof as well as allowing knocked-down shipment for later unskilled assembly of legs, and rigidifies the completed joint against possible wobbling in any direction.

However, angle braces of the general type as well as the particular type disclosed in my aforementioned patent have typically used hanger bolts as the tensile member for tightening and securing the furniture joint. Such hanger bolts have threaded ends that are seated in the furniture leg, after which a standard nut may be run on the straight threaded end of the hanger bolt to secure the joint. In order to prevent splitting or tearing of the leg, and to provide sufficient thread engagement in the wood to prevent pulling the hanger bolt therefrom, It has been necessary to use legs somewhat larger in cross-sectional size than would otherwise be necessary for the strength of the furniture. Also, there is always some danger of misaligned bolt installation in the leg by unskilled labor. Further disadvantages are the inherently more laborious procedure of installing wood screw threads into a predrilled, but still tight, hole, and the need for a special adapter such as an acorn nut for driving a hanger bolt into the wood leg.

In contrast to the prior art, the attachment bracket of the present invention provides a pleasing, finished appearance, allows use of a standard headed bolt installed through a predrilled clearance hole in the leg, and allows tightening of the joint to utilize the full strength of the angle brace without danger of damage to the leg. Since the attachment bracket tends to compress the leg, without any tendency to split, tear, or pull through the leg, the leg may be made somewhat smaller than in the typical prior art construction, with resultant savings of material without danger of damaged goods. Assembly of the leg to the normally pre-assembled side rails and angle braces is simple and may be done by the customer in his home, rather than by the seller, with resultant savings to all. If at some later date the joint loosens through abuse or changing atmospheric conditions, the owner may easily retighten the joint without danger of damage to the leg.

SUMMARY OF THE INVENTION

Briefly described, the present invention provides means for securing a furniture leg and two side members to form a joint including a furniture angle brace extending between and secured to the side members inwardly of the leg, an elongated tensile member extending through the leg and engagable in the brace to draw the brace and side members toward the leg, the tensile member having an enlarged head disposed outwardly of the leg and a non-circular portion disposed inwardly of the head, the bracket having side flanges engaging the leg to prevent rotation of the bracket and a central portion engaged by the tensile member head with an opening shaped to receive the non-circular portion of the tensile member and prevent rotation relative thereto, and means for tightening the brace on the tensile member to draw the brace toward the leg and thereby securely tightening the leg between the said members.

Preferably, the central portion of the bracket projects from the side flanges for engagement of the non-circular portion of the tensile member, and the flanges and the central portion are connected by connecting portions that provide reinforcement of the flanges.

In the preferred embodiment of the present invention, the tensile member is a stove bolt with a square neck, the central portion of the bracket has a flat surface for engagement of the tensile member head and the opening therein is a square hole for engagement therein of the square neck of the bolt. The stove bolt has a threaded portion extending beyond the angle brace and the tightening means is a nut threaded on the threaded portion of the bolt for tightening the brace toward the leg. The leg has an edge at which two side surfaces meet, the central portion of the attachment bracket and the tensile member are disposed at the edge, and the side flanges extend along the side surfaces.

BRIEF DESCRIPTION OF THE DRAWINGS

FIG. 1 is a partially broken-away perspective view of a piano bench incorporating attachment brackets, angle braces, and joints according to the preferred embodiment of the present invention;

FIG. 2 is a plan view of the near corner of the frame of the piano bench of FIG. 1;

FIG. 3 is an enlarged perspective view of the attachment bracket and bolt assembled to a leg;

FIG. 4 is an elevational view of the attachment bracket of FIG. 3 looking axially of the bolt;

DESCRIPTION OF THE PREFERRED EMBODIMENT

Figure 5:
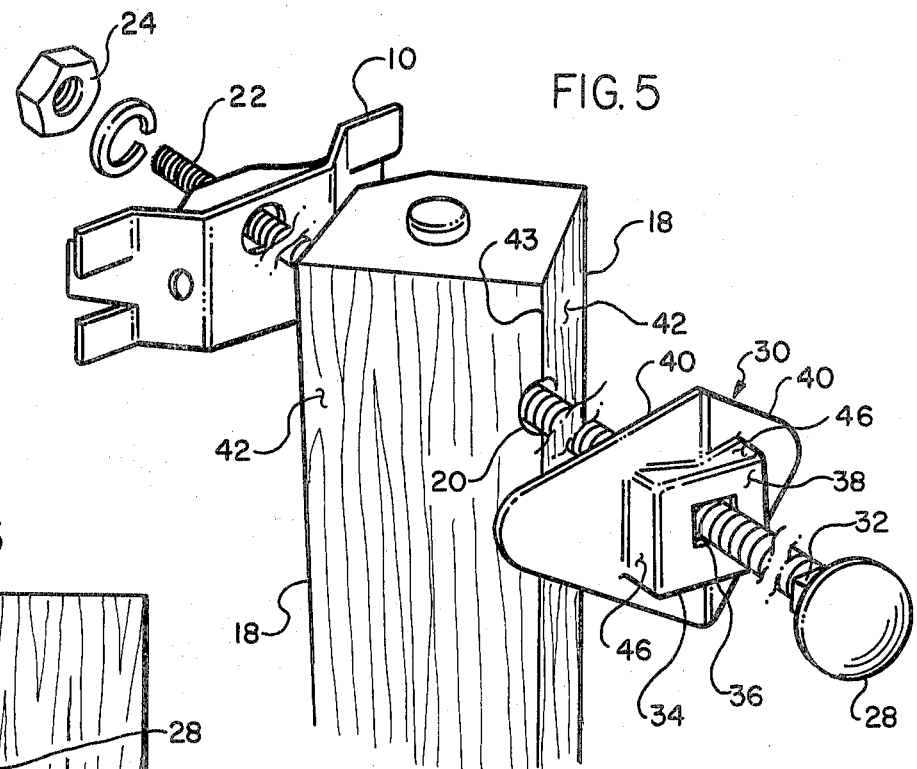
FIG. 5 is an exploded perspective view of the leg, attachment bracket, angle brace, and stove bolt and nut of FIG. 2.
Figure 6:
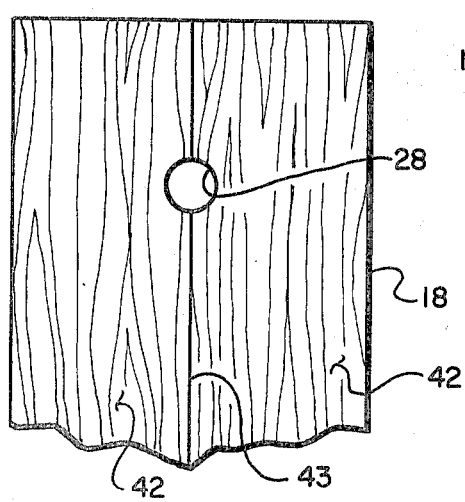
FIG. 6 is an elevational view of the leg only of FIG. 4.

Means for securing a furniture joint according to the preferred embodiment of the present invention, as illustrated in the accompanying drawings, includes an angle brace 10 secured to and extending between two wooden side members or apron rails 12 of a piano bench 14 by screws 16 as best seen in FIG. 2, as is well known in the art.

A wooden leg 18 of the piano bench 14 has a generally square cross-sectional shape, and fits between the ends of the side members 12 as preassembled to the angle brace 10, as is well known in the art, so that the brace 10 is disposed inwardly of the members 12 and the leg 18. A hole 20 bored laterally through the upper end of the leg 18 diagonally of the square cross-section thereof receives an elongated tensile member or stove bolt 22 for extension therethrough for engagement with the angle brace 10 and extension therethrough and beyond for reception of a nut 24 on the extended threaded end of the bolt 22 for drawing and tightening the angle brace 10 and the side members 12 toward the leg 18 for securing the leg 10 and said members 12 together to form the joint 26.

The enlarged head 28 of the bolt 22 is disposed outwardly of the leg 18, and an attachment bracket 30 is disposed between the head 28 and the leg 18 to absorb the pressure created therebetween when the nut 24 is tightened on the bolt 22 for securing the joint 26.

An inwardly disposed non-circular, preferably square, neck portion 32 of the bolt 22 disposed adjacent the head 28 thereof engages a flat-surfaced central portion 34 of the bracket 30 having an opening or hole 36 of non-circular or square configuration which is shaped to receive and engage therein the neck 32. The opening 36 is only slightly larger than the neck 32 for preventing relative rotation therebetween, and the under side of the head 28 is received against and engages the flat surface 38 of the portion 34 for applying pressure thereto upon tightening of the nut 24 on the bolt 22 for tightening the brace 10 on the bolt 22 to draw the brace 10 toward the leg 18 and thereby to securely tighten the leg 18 between the side members 12 for securing the joint 26.

The attachment bracket 30 has side flanges 40 extending generally laterally from said flat-surfaced portion 34 for engagement with the leg 18 for prevention of rotation of the bracket 30 relative thereto during the application of securing force to the joint 26. In the preferred embodiment disclosed herein, the leg 18 has flat side surfaces 42 which meet at an edge 43, the central portion 34 of the bracket 30 and the bolt 22 being disposed thereat, and the flanges 40 extend toward the side members 12 respectively and have laterally extending flat surfaces 44 thereon which extend along the flat side surfaces 42 in coplanar engagement respectively therewith.

The flat-surfaced central portion 34 of the bracket 30 projects from the side flanges 40 thereof for engaging the neck portion 32 of the bolt 22. Structural connecting portions 46 extend generally perpendicularly from the portion 34 to the flanges 40 for connecting the portion 34 and the flanges 40 and for reinforcing them.

Piano benches 14 constructed in accordance with the present invention are typically shipped in partially preassembled, partially knocked-down form; i.e., all four side members 12 and angle braces 10 are preassembled in final form with a seat 48 conventionally hinged to one side member 12, but the legs 18, the attachment brackets 30, and the stove bolts and nuts 22 and 24 are left unassembled for shipping within the confines of the side members 12, thereby significantly reducing the shipping costs. The angle braces 10 and the side members 12 having been accurately manufactured and pre-drilled for the screws 16, and the legs 18 also having been accurately manufactured and drilled at the bore 20 for the stove bolt 22, the final assembly of the legs to the frame or bench portion formed by the side members 12 and the angle braces 10 can be easily accomplished by the most unskilled person, preferably the purchaser of the bench 14, who may carry it home in its original packing carton and assemble it very quickly and easily with no more tools than a pair of pliers, without any danger of misassembly or damage to the parts. If the legs 18 thereafter become loose, due to normal wear and tear, abuse, changing atmospheric conditions, etc., it is again a simple matter to tighten the joints with a pair of pliers to restore the bench 14 to its original sturdy condition, without danger of damage to structure or appearance.

Alternatively, a special bolt might be provided to combine in a single element the essential qualities of the stove bolt and the attachement bracket of the present invention, but is believed that such a special bolt would be expensive and difficult to manufacture, and it would not provide as much flexibility in conforming to any normal manufacturing misalignment of the hole 20 with the leg 18 or the sides 42 thereof.

The particular embodiment disclosed in full detail herein and illustrated in the drawings has been provided for disclosure purposes only and is not intended to limit the scope of the present invention, which is to be determined by the scope of the appended claims, nor is the invention intended to be limited to piano benches, for it may be equally useful in other articles of furniture, such as tables, chairs, or other furniture pieces having legs and side rails.

I claim:

1. Means for securing a furniture leg of the type having side surfaces and an edge at which two said side surfaces meet, and two side members to form a joint comprising a furniture angle brace extending between and secured to said side members inwardly of said leg, an elongated stove bolt extending through said leg at said edge and engaged in said brace to draw said brace and side members toward said leg, said stove bolt having an enlarged head disposed outwardly of said leg, a square neck disposed inwardly of said head, and a threaded portion extending beyond said brace, an attachment bracket disposed between said stove bolt head and said leg, said bracket having side flanges engaging said leg and extending along said two side surfaces thereof to prevent rotation of said bracket and a raised square-shaped central portion disposed at said edge and projecting from said side flanges and connected thereto by connecting portions providing reinforcement of said flanges, said central portion having a flat surface engaged by said stove bolt head with a square hole in said flat surface receiving said square neck of said stove bolt to prevent rotation relative thereto, and a nut threaded on said stove bolt threaded portion for tightening said brace on said stove bolt to draw said brace toward said leg and thereby securely tighten said leg between said side members.

* * * * *